US011341456B2

(12) United States Patent
Shearin et al.

(10) Patent No.: US 11,341,456 B2
(45) Date of Patent: May 24, 2022

(54) COMPACT AND LOW-POWER SHELF MONITORING SYSTEM

(71) Applicant: Datalogic USA, Inc., Eugene, OR (US)

(72) Inventors: Alan Shearin, Eugene, OR (US); WenLiang Gao, Eugene, OR (US); Brett Howard, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 0 days.

(21) Appl. No.: 17/002,168

(22) Filed: Aug. 25, 2020

(65) Prior Publication Data

US 2022/0067636 A1    Mar. 3, 2022

(51) Int. Cl.
*G06Q 10/08* (2012.01)
*H04N 5/225* (2006.01)
*H04N 5/232* (2006.01)
*H04N 7/18* (2006.01)

(52) U.S. Cl.
CPC ......... *G06Q 10/087* (2013.01); *H04N 5/2253* (2013.01); *H04N 5/23241* (2013.01); *H04N 5/23299* (2018.08); *H04N 7/188* (2013.01)

(58) Field of Classification Search
CPC ............ G06Q 10/087; H04N 4/23299; H04N 5/23241; H04N 7/188
See application file for complete search history.

(56) References Cited

U.S. PATENT DOCUMENTS

| 5,423,617 A * | 6/1995 | Marsh .................... A47F 10/02 400/82 |
| 5,842,057 A | 11/1998 | Nomura et al. |
| 6,105,004 A | 8/2000 | Halperin et al. |
| 7,545,436 B2 | 6/2009 | Lee et al. |
| 8,260,456 B2 | 9/2012 | Siegel et al. |
| 8,321,303 B1 | 11/2012 | Krishnamurthy et al. |
| 9,949,576 B2 * | 4/2018 | Giulietti .................... A47F 3/00 |
| 9,984,355 B2 | 5/2018 | Jones et al. |
| 9,996,818 B1 * | 6/2018 | Ren .................... G06F 16/5854 |
| 10,044,985 B1 | 8/2018 | Parker |
| 10,169,660 B1 | 1/2019 | Ren et al. |
| 10,169,677 B1 | 1/2019 | Ren et al. |
| 10,176,452 B2 | 1/2019 | Rizzolo et al. |
| 10,192,087 B2 | 1/2019 | Davis et al. |
| 10,339,656 B1 * | 7/2019 | Le .............................. G06T 7/50 |
| 10,873,726 B1 * | 12/2020 | Maldonado ............ H04N 7/181 |
| 10,997,835 B1 * | 5/2021 | Gu .................... G08B 13/19641 |
| 2001/0004283 A1 * | 6/2001 | Akimoto ................ G03B 21/28 353/77 |
| 2002/0015094 A1 * | 2/2002 | Kuwano .......... G08B 13/19602 348/143 |
| 2002/0138374 A1 | 9/2002 | Jennings et al. |
| 2002/0143672 A1 * | 10/2002 | Sawasaki ............. G06Q 10/087 705/29 |

(Continued)

*Primary Examiner* — Peter D Le
(74) *Attorney, Agent, or Firm* — Stoel Rives LLP

(57) ABSTRACT

The disclosure relates to an inventory management system including one or more imagers mounted to shelving or other structures displaying items for sale, where the imagers are designed to capture images of the items and relay information to a database for purposes of tracking the items and managing inventory. The imagers are compact, low power devices incorporating wireless means for communicating with the database and may include solar cell arrays for charging purposes.

20 Claims, 3 Drawing Sheets

(56) References Cited

U.S. PATENT DOCUMENTS

| | | | |
|---|---|---|---|
| 2003/0154141 A1 | 8/2003 | Capazario et al. | |
| 2003/0164754 A1* | 9/2003 | Roseen | F25D 25/00 340/309.16 |
| 2005/0030736 A1* | 2/2005 | Chuang | A47F 3/0443 362/92 |
| 2005/0131578 A1 | 6/2005 | Weaver | |
| 2006/0173756 A1 | 8/2006 | Benight | |
| 2007/0240735 A1* | 10/2007 | Aoyama | G03F 7/70925 134/1 |
| 2008/0036897 A1* | 2/2008 | Abe | G02B 27/022 348/335 |
| 2008/0077510 A1* | 3/2008 | Dielemans | G06Q 10/087 705/28 |
| 2008/0140478 A1 | 6/2008 | Goldberg et al. | |
| 2008/0190875 A1* | 8/2008 | Ikeda | A47F 3/001 211/153 |
| 2008/0306787 A1 | 12/2008 | Hamilton et al. | |
| 2009/0021351 A1 | 1/2009 | Beniyama et al. | |
| 2009/0060349 A1 | 3/2009 | Linaker et al. | |
| 2009/0063307 A1* | 3/2009 | Groenovelt | G06Q 10/087 705/28 |
| 2009/0097615 A1* | 4/2009 | Fischer | G06T 5/50 378/98.3 |
| 2009/0121017 A1* | 5/2009 | Cato | G06Q 10/087 235/385 |
| 2009/0189981 A1* | 7/2009 | Siann | H04N 7/188 348/143 |
| 2009/0204512 A1* | 8/2009 | Connell, II | G06Q 10/087 705/28 |
| 2010/0010902 A1* | 1/2010 | Casey | G06Q 20/208 705/17 |
| 2010/0138281 A1 | 6/2010 | Zhang et al. | |
| 2010/0222144 A1* | 9/2010 | Ohba | A63F 13/213 463/35 |
| 2013/0048724 A1 | 2/2013 | Burnside et al. | |
| 2013/0235206 A1 | 9/2013 | Smith et al. | |
| 2013/0245810 A1* | 9/2013 | Sullivan | B65G 1/1371 700/214 |
| 2015/0029339 A1* | 1/2015 | Kobres | H04N 7/181 348/150 |
| 2015/0049904 A1* | 2/2015 | Sen | G06Q 10/087 382/103 |
| 2015/0088701 A1* | 3/2015 | Desmarais | G06Q 10/087 705/28 |
| 2016/0124130 A1* | 5/2016 | Kruschwitz | G02B 5/28 348/79 |
| 2018/0005176 A1 | 1/2018 | Williams et al. | |
| 2018/0020145 A1* | 1/2018 | Kotfis | G06Q 10/087 |
| 2019/0379836 A1* | 12/2019 | Mori | G06T 7/70 |
| 2020/0125854 A1 | 4/2020 | Seres | G02B 7/1827 |
| 2021/0216951 A1* | 7/2021 | Schumacher | G06Q 30/0281 |
| 2021/0216952 A1* | 7/2021 | Schumacher | G06K 9/00771 |
| 2021/0272086 A1* | 9/2021 | Buibas | G06K 19/06028 |

* cited by examiner

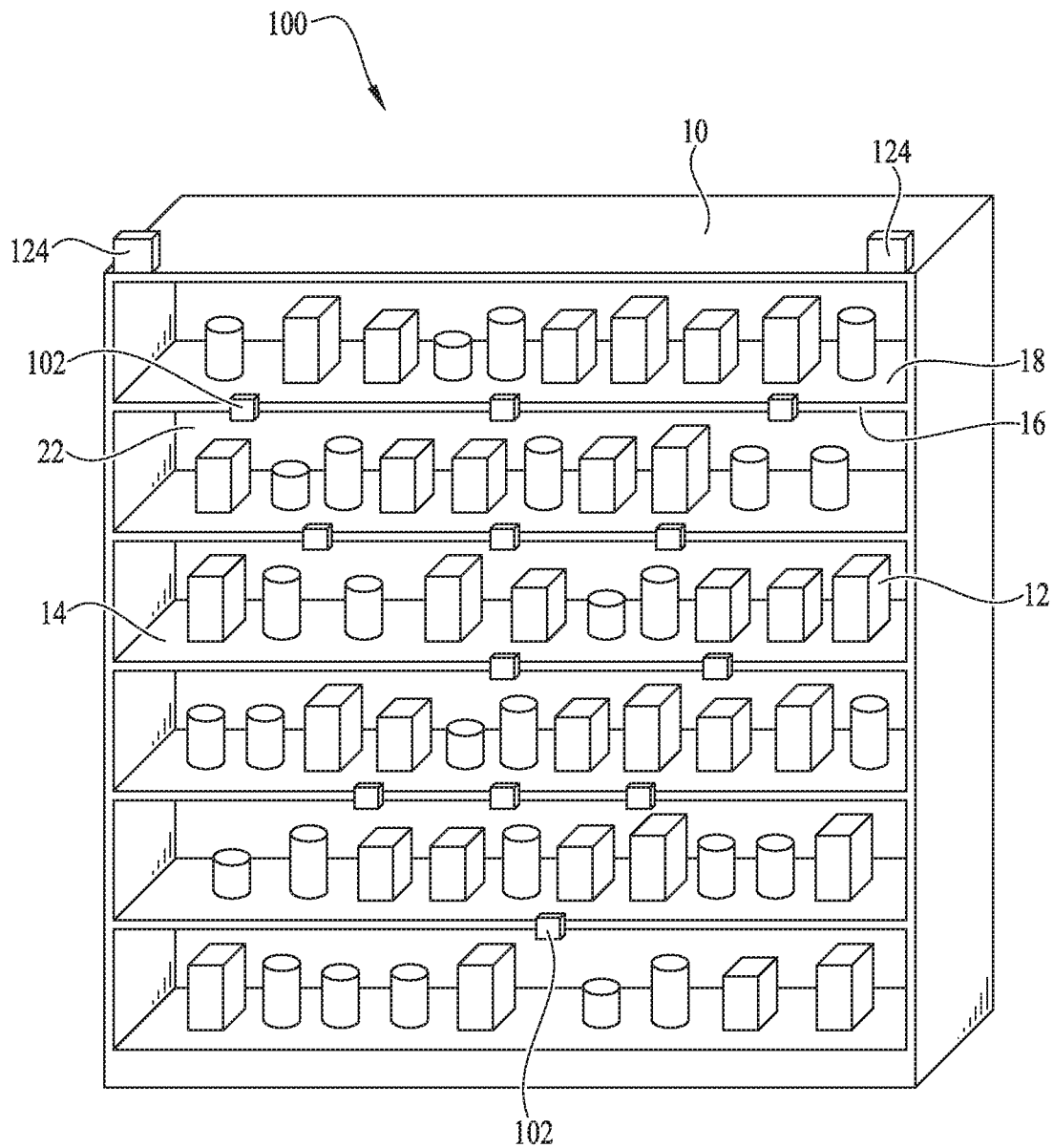

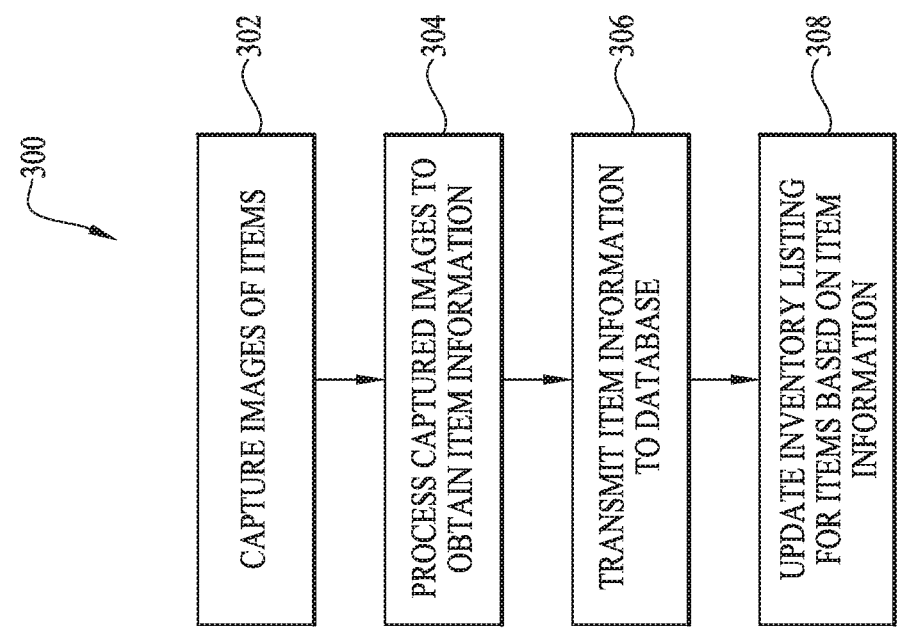
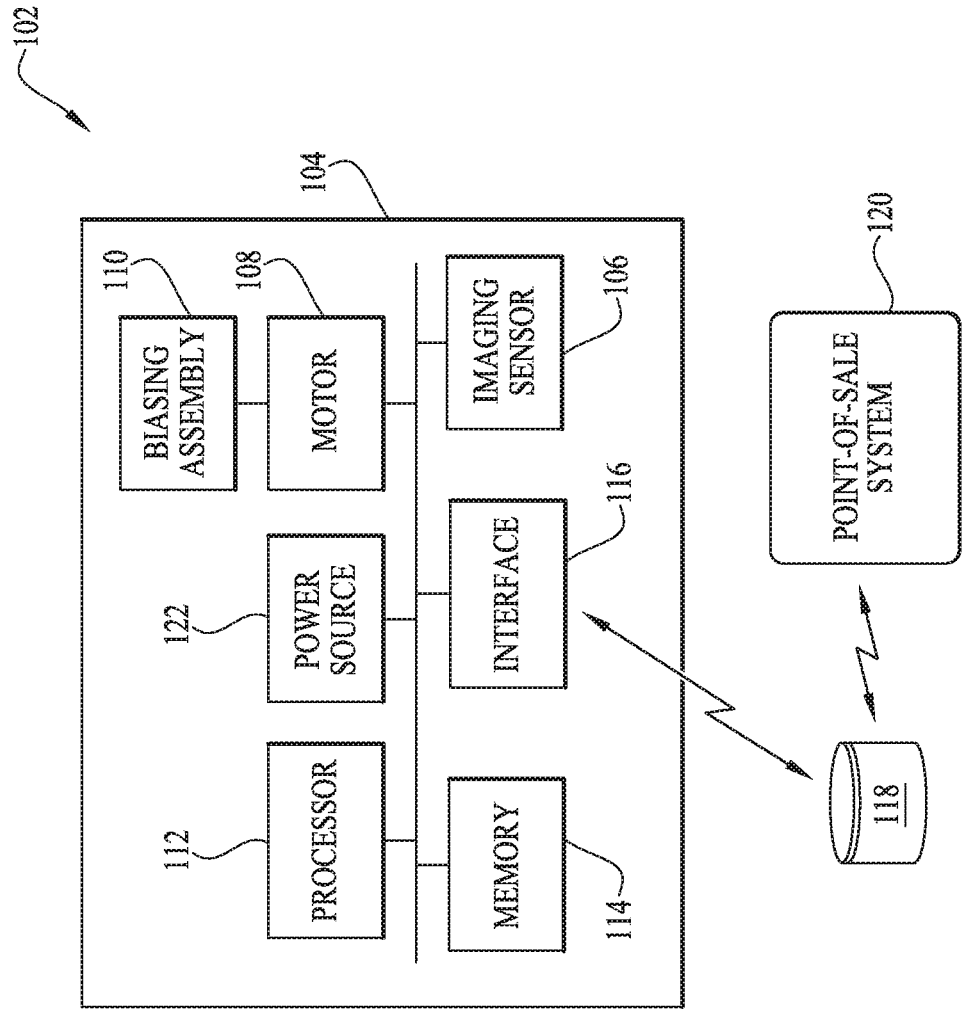

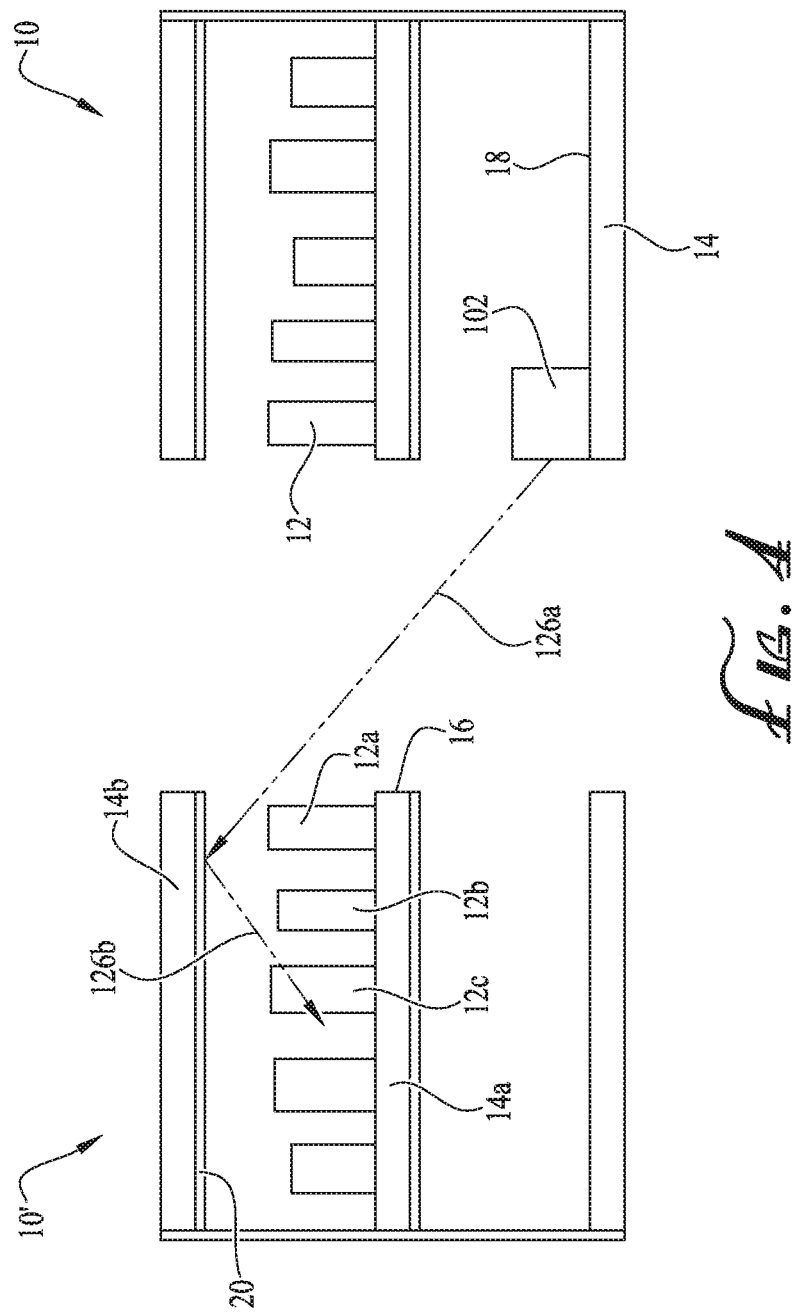

COMPACT AND LOW-POWER SHELF MONITORING SYSTEM

BACKGROUND

The field of the present disclosure relates generally to shelf-monitoring systems, and more particularly, to such systems that incorporate imaging cameras into the shelves for monitoring and tracking item inventory.

In a retail environment, shelf space is a key resource. Accordingly, proper management of shelf space is critical for retailers to drive profit increases and reduce operating costs. Inventory management is a constant struggle for retail establishments. Some retailers rely on store personnel to routinely walk the floor and inspect shelves to track and manage inventory. Such processes are time-intensive and reduce the available personnel for helping customers or performing other important tasks. Some technology-driven solutions have been developed that rely on barcode labels, sensors, and other item identifiers to track inventory. Such systems typically follow sales and transaction data of the items to track inventory, but these tracking methods often fail to account for items that are missing from shelves due to theft, breakage, spillage, or item misplacement by customers. Other similar solutions may avoid some of these shortcomings by using radio frequency identification (RFID) tags to track items and their movement within the store. However, a significant disadvantage of this system is that each item must include an RFID tag, which would require either the manufacturer or the retail establishment to add those tags to each item, resulting in an appreciable increase in item cost due to the expense of the RFID tags and the necessary labor involved. These additional costs may reduce store profits or may result in higher item prices that may lead to the loss of customers to competitors.

Accordingly, the present inventors have identified a need for a streamlined and cost-effective monitoring system designed to monitor retail shelves, and to communicate item information to a database or other system to facilitate inventory management. In addition, the present inventors have identified a need for such a system having one or more imaging cameras equipped with suitable charging capabilities and efficient power management designed for long-term use. Moreover, the present inventors have identified a need for deploying such a system without requiring much modification to existing shelving by eliminating or minimizing wired connections to external power sources. Additional aspects and advantages of the shelf-monitoring system will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 1 is a schematic view of a retail display incorporating a plurality of imagers for monitoring items and managing inventory in accordance with one embodiment.

FIG. 2 is a block diagram illustrating various components for one of the imagers in accordance with one embodiment.

FIG. 3 is a block diagram of a process for inventory management in accordance with one embodiment.

FIG. 4 is a schematic view of an imager mounted on a shelf for capturing images of items on an opposite shelf in accordance with one embodiment.

DETAILED DESCRIPTION OF DISCLOSED EMBODIMENTS

With reference to the drawings, this section describes embodiments of an inventory management system and related methods of operation. Throughout the specification, reference to "one embodiment," "an embodiment," or "some embodiments" means that a described feature, structure, or characteristic may be included in at least one embodiment of the systems and methods described herein. Thus, appearances of the phrases "in one embodiment," "in an embodiment," or "in some embodiments" in various places throughout this specification are not necessarily all referring to the same embodiment. Furthermore, the described features, structures, and characteristics may be combined in any suitable manner in one or more embodiments. In view of the disclosure herein, those skilled in the art will recognize that the various embodiments can be practiced without one or more of the specific details or with other methods, components, materials, or the like. In some instances, well-known structures, materials, or operations are not shown or not described in detail to avoid obscuring aspects of the embodiments.

FIGS. 1-4 collectively illustrate embodiments of an inventory management system 100 designed for aiding in accurately tracking on-shelf inventory in a retail setting (or other suitable environments). As further described in detail below with reference to the figures, the inventory management system 100 includes one or more imaging cameras or imagers 102 mounted to one or more shelves 14 displaying various items 12 for sale, where the imagers 102 are operable to capture images of the items 12 on the shelves 14 at various time intervals. The imagers 102 (or other suitable device) process the captured images and communicate item information to an external database 118 for aggregating the item data for use in tracking item inventory. In some embodiments, the database 118 may also be in communication with one or more point-of-sale systems 120 to compare sales data with on-shelf tracking data as obtained by the imagers 102 for validation purposes to improve overall accuracy of the inventory management system 100. In some embodiments, each of the imagers 102 incorporates a small, solar panel with a capacitor or other suitable components to employ recharging methods that don't require wired connections to exterior power sources or modifications to existing retail shelving. Additional details of these and other embodiments of the inventory management system 100 are described below with reference to the figures.

FIG. 1 is a schematic illustration of an inventory management system 100 in accordance with one embodiment. With reference to FIG. 1, the inventory management system 100 includes one or more imaging cameras or imagers 102 mounted at various locations on a retail display 10 to detect the presence of multiple items 12 for tracking purposes. The imagers 102 periodically obtain images for items 12 in the retail display 10 positioned within its field-of-view. Once the imagers 102 obtain the images, the images are analyzed using image processing techniques to identify the items 12. In some embodiments, the processing techniques of the images may involve looking for specific item shapes, patterns, logos, words, barcodes, or other suitable features to identify the items 12. The imagers 102 may be spaced apart on the retail display 10 in any suitable configuration to provide a complete view of the shelving and items 12 offered for sale. In some embodiments, images from various imagers 102 may be stitched together to form larger, more complete images of the items 12 as desired to help identify items 12 that may be partially captured by two or more different images. In some embodiments, the imagers 102 may be capable of a slow speed scan to reduce the number of imagers 102 and associated hardware needed to track items 12 on the retail display 10. Additional features and components of the imagers 102 are described further with reference to FIG. 2-4 below.

Turning back to FIG. 1, the imagers 102 may be mounted in any suitable configuration relative to the shelves 14 such that the items 12 on the opposing shelf (see FIG. 4) are within the field-of-view of at least one of the imagers 102. For example, the imagers 102 may be mounted on a front face 16 of the shelves 14 (e.g., adjacent price tags or display names of the shelved items) or on a bottom wall 18 of the shelves 14, or on a rear wall 22 of the shelves 14. In other embodiments, the imagers 102 may be mounted above the shelves 14, such as on a ceiling or other structure (not shown) and pointed downwardly toward the retail display 10. In still other embodiments, the imagers 102 may be arranged to view items positioned behind the frontmost item in the rows as further described in detail below with reference to FIG. 4.

FIG. 2 is a block diagram illustrating various components for one of the imagers 102 in accordance with one embodiment. With reference to FIG. 2, the imager 102 includes an exterior housing 104 carrying an image sensor 106 for capturing images of the items 12. The imager 102 may include additional illumination sources (not shown), but the imager 102 may use the ambient store lighting. In some embodiments, the image sensor 106 is a small, low power, light weight, auto-focus camera module like that of a modern cellphone camera. In other embodiments, the image sensor 106 may be any suitable sensor with any appropriate resolution and may be capable of capturing wide-angle images if desired.

The imager 102 may include a slow, low-cost, low-power motor 108 operable to slowly rotate the image sensor 106 to accommodate wider scan capabilities for the imager 102, thereby providing for the use of fewer imagers 102 to capture a designated area or region of items 12. In some embodiments, the shelf-scanning process may run continuously, but in other embodiments, the image-capture process may be timed to capture images at predetermined intervals (e.g., every 15 minutes or on an hourly schedule). In other embodiments, the image-capture process may be manually activated on command as desired by store personnel. In still other embodiments, the retail display 10 may include a sensor system 124 operable to detect the presence of a person near the retail display 10. The sensor system 124 may include one or more beacons incorporated into one of the shelves 14, where the beacon is operable to detect the presence of a mobile device (e.g., a smart phone, any wearable device, or other suitable electronic device), such as via Bluetooth signals, carried by the person. Once the person is out of range of the sensor 124, which means the person is no longer in the aisle near the retail display 10, the sensor 124 may send a signal to the imager 102 to initiate the image-capture cycle to determine whether the person removed an item 12 from the shelves 14.

In some embodiments, the scan mechanism of the imager 102 may be supplemented using a mechanical reset spring 110 or other suitable biasing assembly coupled to the motor 108 depending on the energy efficiency of the motor 108 and data transmission requirements. In such embodiments, this arrangement may permit the imager 102 to slowly scan in one direction, where the imager 102 moves from a starting or first position to an ending or second position. When the imager 102 has reached the second position, the spring 110 returns the imager 102 back from the second position to the first position in preparation for a subsequent scan sequence.

The imager 102 includes a processor 112 in communication with the image sensor 106. The processor 112 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The image sensor 106 may include a photosensor or pixel array, which may include any of a variety of light sensing components to effect the capture of an image. Such components may include a charge-coupled device (CCD), a complementary metal oxide semiconductor (CMOS), or other imaging pixel array, operating under the control of the circuitry associated with the image sensor 106.

The processor 112 is operable to perform image-processing techniques to analyze the captured images. The processor 112 may run any suitable image-processing protocols or search for specific image elements, such as logos, words, barcodes, or other suitable item identifiers, to identify the items 12. The imager 102 may include suitable memory 114 for storing images, data, operating instructions or programs, or other suitable protocols for operating the imager 102.

In some embodiments, the imager 102 includes a wireless interface 116 (although other embodiments may instead employ wired connections) linked to an external database 118 for communicating the images, identity of the items, or other suitable item information as desired. The wireless interface 116 may use any suitable wireless protocol, such as LiFi, WiFi, IrDA, Bluetooth, or LoRA to communicate with the database 118. The database 118 stores item data and is used to track item inventory status based on the information obtained by the imagers 102 in conjunction with sales transaction data obtained at a register or suitable point-of-sale system 120 and inventory data tracking incoming deliveries by suppliers.

A power supply 122 provides power to the imager 102 and its components. In some embodiments, the power supply 122 may include any suitable battery source or system. In some embodiments, the power supply 122 is a rechargeable power source to minimize wired connections to external power sources. For example, in one embodiment, the power supply 122 includes one or more solar cells capable of recharging and powering the imager 102 using ambient lighting. The solar cells may be of amorphous silicon construction capable of efficiently converting fluorescent lighting power of the retail environment into an electrical charge for power the components of the imager 102.

In some embodiments, the inventory management system 100 uses a low power arrangement to minimize power consumption and avoid the need to modify or retrofit existing retail displays 10. The following provides additional details of one such low-power configuration in accordance with one embodiment. With general reference to FIGS. 1-2, the inventory management system 100 uses low power imagers 102 employing image transmission protocols that use no more than approximately 300 mW of operating power. The imagers 102 operate on very low duty cycles, such as capturing one frame every 30 minutes with or without a low power scan mechanism (such as MEMS mirror with less than 1 mW and driving circuit power of less than 10 mW). Based on these factors, the following is a power estimation for an example arrangement of a typical imager 102: <350 mW capture for 30 ms+500 mW transfer for 5 sec (JPEG image output of 150 KB)/30 min=1.5 mW. In one embodiment, an example imager 102 may be A20260 by Onsemi, ISX005, 6 by Sony. In another embodiment, a backscatter-based imager 102 may be used operating at a capture rate of one frame/30 minutes. For such configuration, the average power estimation is: (90 mW capture for 30 ms+15 mW transfer for 3500 ms)/30 minutes=40.5 µW, and the peak power for the imager 102 may be 105 mW for 30 msec. It should be understood that the foregoing example is for illustration purposes and not necessarily intended to be limiting.

FIG. 3 is a block diagram of an inventory management process 300 in accordance with one embodiment. Generally, the inventory management process 300 uses the on-shelf imagers 102 to gather images and process data about the items 12 on the monitored shelves 14. The data gathered by the imagers 102 is processed and transmitted to the external database 120, which may include data analytics software for processing the data obtained by the imagers 102 and assessing inventory conditions to help manage product stock levels and avoid product shortages or overstocks. The inventory management process 300 helps streamline the process, improve overall efficiency, and allows retailers to redirect store personnel to more important tasks.

With reference to FIG. 3, the inventory management process 300 begins at step 302 where images of items 12 and shelf space in the field-of-view of the imagers 102 are captured. As noted previously, the images may be captured at any suitable time interval (e.g., one image per 30 minutes). In some embodiments, stitching techniques may be used to combine multiple images gathered by multiples imagers 102. At step 304, the captured images are processed to obtain item identification data. As noted previously, the processing techniques may decode optical codes from the images or may analyze logos or other information to identify the items. In some embodiments, the processing may be performed either partially or entirely by the imager 102 (such as via the processor 112 and/or other suitable components). The data obtained from the images (and/or the images themselves) is transmitted via the wireless interface 116 (or a wired connection) of the imager 102 to the external database 120 for additional data processing at step 306. Relevant data pertaining to item inventory information (e.g., the number of items 12 left on the shelf 14) is updated and stored in the database 120 at step 308 for review by store personnel in making decisions relating to inventory management (e.g., to order additional product, communicate with manufacturers, etc.).

It should be understood that the steps for the inventory management process 300 described above may be altered in other embodiments without departing from the principles of the disclosed subject matter. For example, in one embodiment, the imager 102 may gather images of the items 12, but the images may not be processed by the processor 112. Instead, the images are transmitted to the database 120, and the database 120 processes the images to identify the items 12. Thereafter, the item information is used to update the inventory.

As noted previously, the imagers 102 may be placed in various locations on the shelves 14 of the retail display 10 for monitoring items 12. In one embodiment, imagers 102 may be mounted on poles (not shown) that arch over the aisle between two opposing retail shelf displays 10, where the pole-mounted imagers 102 document the items 12 on the retail displays 10. Alternatively, the imagers 102 may be distributed along the front face 16 of the shelves 14 and interspersed with shelf product labels and/or price tags for the items 12. In some embodiments, the imagers 102 may be integrated with electronic displays (e.g., smart displays that function as electronic tags and/or electronic product labels). As mentioned previously, the imagers 102 may include solar arrays for recharging purposes, but in other embodiments, the imagers 102 may be powered by a single power source (not shown) and charging system (not shown) positioned at the end of the aisle (or other suitable location), with all the wiring for the imagers 102 embedded within the edge of the shelf 14. In some embodiments, the imagers 102 may be arranged to cover only targeted items that may be more critical (e.g., high value items, fast-selling items, sale items, etc.) for the retail establishment to monitor.

In some embodiments, the retailer may elect to monitor not only the first row of items 12 on the shelves 14, but also the items behind the frontmost items to more accurately track the total number of items on display at a given time. In such embodiments, the retail displays 10 may be modified and the imagers 102 may be arranged in a proper configuration to monitor items located behind the frontmost item on the shelf 14. FIG. 4 is a schematic view of one such configuration.

FIG. 4 illustrates a first retail display 10 including one or more shelves 14 and an opposite second retail display 10' with one or more shelves 14a, 14b, where the retail displays 10, 10' face one another. While each of the retail displays 10, 10' may include a plurality of items 12, FIG. 4 illustrates a simplified configuration with fewer items 12 to avoid obscuring more pertinent aspects of the disclosure. As illustrated in FIG. 4, the shelf 14a of the second retail display 10' includes a first or frontmost item 12a arranged adjacent a front face 16 of the shelf 14a, and a plurality of items 12b, 12c arranged behind the frontmost item 12a, where the frontmost item 12a generally obstructs the plurality of items 12b, 12c from view. The first retail display 10 includes one or more imagers 102 mounted along a bottom wall 18 of the shelf 14 and arranged for capturing images of the items 12a, 12b, 12c located on the opposite retail display 10'. The opposite retail display 10' includes a second shelf 14b located above the first shelf 14a, where the second shelf 14b includes a reflective material 20 coupled to or otherwise disposed on an underside of the shelf 14b, where the reflective material 20 generally faces the items 12a, 12b, 12c on the first shelf 14a. The reflective material 20 may be a reflective film or paper, a mirror, or other suitable material capable of reflecting a field-of-view of the imager 102. In some embodiments, each of the shelves 14a, 14b, and so on of the second retail shelf display 10' may include the reflective material 20 arranged in a similar fashion as described with reference to shelf 14b. In other embodiments, only certain shelves with targeted items (e.g., high value items, fast-selling items, sale items, etc.) may include the reflective material 20.

As illustrated in FIG. 4, in this configuration, the imager 102 directs a first field-of-view 126a toward the shelves 14a, 14b and upwardly at the reflective material 20. The reflect material 20 redirects the field-of-view 126b downwardly toward the items 12b, 12c on the shelf 14a arranged behind the frontmost item 12a. Accordingly, the imager 102 is able to capture images of the items 12b, 12c to obtain a more accurate tally of all items 12 on the second retail display 10'. It should be understood that in a more typical retail environment, most or all of the shelves 14 of both retail displays 10, 10' may incorporate the reflective material 20, and all shelves 14 of both retail displays 10, 10' may include 12 items arranged as described above with reference to shelf 14a. In this configuration, the imagers 102 of the first retail display 10 may capture the items 12 on the second retail display 10' and vice versa.

It should be understood that many of the components and arrangements described in the embodiments of FIGS. 1-4 are for illustration purposes. Accordingly, one having ordinary skill in the art may rearrange the components of the embodiments described herein without departing from the principles of the disclosure.

In addition, it is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the disclosure.

The invention claimed is:

1. An inventory management system for tracking and monitoring a plurality of items, the system comprising:
    a first fixed retail display including one or more shelves and a second fixed retail display including one or more shelves, the first and second fixed retail displays facing one another across an aisle in a retail environment;
    a plurality of items arranged on a first shelf of the first fixed retail display, the plurality of items including a frontmost item adjacent a front face of the first shelf, and one or more items arranged on the first shelf behind the frontmost item;
    a reflective material coupled to an underside of a second shelf of the first fixed retail display, the second shelf located above the first shelf with the plurality of items; and
    a first imager mounted to a first shelf of the second fixed retail display, the imager having a field-of-view directed across the aisle and toward the first shelf of the first fixed retail display, wherein the field-of-view of the first imager is reflected downwardly by the reflective material on the underside of the second shelf, the first imager operable to capture one or more images of the one or more items arranged on the first shelf behind the frontmost item.

2. The inventory management system of claim 1, wherein the first imager includes a scan mechanism including a biasing assembly coupled to a low power motor operable to rotate the first imager between a first position and a second position to enlarge the effective field-of-view of the first imager wherein the biasing assembly is configured to urge the first imager to return back to the first position responsive to the motor reaching the second position.

3. The inventory management system of claim 2, wherein the biasing assembly comprises a mechanical reset spring.

4. The inventory management system of claim 1, the first imager further comprising a solar cell array operable to convert ambient lighting to an electrical charge for powering the first imager.

5. The inventory management system of claim 1, further comprising a database in operable communication with the first imager, the database operable to receive item information for the one or more items arranged on the first shelf behind the frontmost item captured by the first imager, the database further processing the item information and updating an inventory listing associated with the one or more items.

6. The inventory management system of claim 1, further comprising a second plurality of items arranged on the first shelf of the first fixed retail display, the second plurality of items including a second frontmost item adjacent the front face of the first shelf and offset from the frontmost item, the second plurality of items including one or more items arranged on the first shelf behind the second frontmost item, the system further comprising a second imager offset from the first imager and mounted to the first shelf of the second fixed retail display, the second imager having a field-of-view directed across the aisle and toward the first shelf of the first fixed retail display, wherein the field-of-view of the second imager is reflected downwardly by the reflective material on the underside of the second shelf, the second imager operable to capture one or more images of the second plurality of items arranged on the first shelf.

7. The inventory management system of claim 1, wherein the reflective material is one of a reflective film or a mirror.

8. The inventory management system of claim 1, further comprising a sensor system operable to detect a presence of a person between the first and second fixed retail displays, the sensor system in operable communication with the first imager, wherein the sensor system activates the first imager to capture the one or more images of the one or more items when the sensor system no longer detects the presence of the person between the first and second fixed retail displays.

9. The inventory management system of claim 8, wherein the sensor system includes a signal that communicates with a mobile device carried by the person to detect the presence of the person.

10. The inventory management system of claim 1, wherein the first imager mounted to the first shelf of the second fixed retail display is located on a plane that is below a plane where the plurality of items are arranged on the first shelf of the first fixed retail display.

11. A method for tracking and monitoring a plurality of items, the method comprising:
    arranging a plurality of items on a first shelf of a first fixed retail display, the plurality of items including a frontmost item adjacent a front face of the first shelf, and one or more items arranged on the first shelf behind the frontmost item;
    disposing a reflective material on an underside of a second shelf of the first fixed retail display, the second shelf located above the first shelf with the plurality of items;
    mounting a first imager to a first shelf of a second fixed retail display that faces the first retail display across an aisle of a retail environment;
    directing a field-of-view of the first imager across the aisle and toward the first shelf of the first fixed retail display;
    reflecting the field of view of the first imager downwardly by the reflective material on the underside of the second shelf; and
    capturing, via the first imager, one or more images of the one or more items arranged on the first shelf behind the frontmost item.

12. The method of claim 11, further comprising:
    rotating, via a lower power motor of a scan mechanism, the first imager between a first position and a second position to enlarge the effective field-of-view of the first imager; and
    biasing, via a biasing assembly of the scan mechanism coupled to the low power motor, to urge the first imager to return back to the first position responsive to the motor reaching the second position.

13. The method of claim 11, further comprising powering the first imager via a solar cell array operable to convert ambient lighting to an electrical charge.

14. The method of claim 11, further comprising:
arranging a second plurality of items including a second frontmost item adjacent the front face of the first shelf and offset from the frontmost item, the second plurality of items including one or more items arranged on the first shelf behind the second frontmost item;
mounting a second imager offset from the first imager to the first shelf of the second fixed retail display;
directing a field-of-view of the second imager toward the first shelf of the first fixed retail display;
reflecting the field-of-view of the second imager downwardly by the reflective material on the underside of the second shelf; and
capturing, via the second imager, one or more images of the second plurality of items arranged on the first shelf.

15. The method of claim 11, further comprising:
detecting, via a sensor system, a presence of a person between the first and second fixed retail displays;
communicating, via the sensory system, an activation signal to the first imager in response to the sensor system no longer detecting the presence of the person; and
activating the first imager to capture the one or more images of the one or more items in response to receiving the activation signal.

16. The method of claim 15, wherein the sensor system includes a signal that communicates with a mobile device carried by the person to detect the presence of the person.

17. An inventory management system for tracking and monitoring a plurality of items, the system comprising:
a first fixed retail display including one or more shelves extending down an aisle of a retail environment;
a second fixed retail display including one or more shelves extending down the aisle of the retail environment and, the first and second fixed retail displays facing one another across the aisle;
reflective material coupled to an underside of one or more shelves of the first fixed retail display;
reflective material coupled to an underside of one or more shelves of the second fixed retail display;
a first plurality of imagers mounted to one or more shelves of the first fixed retail display having fields-of-view directed across the aisle and toward a shelf of the second fixed retail display to be reflected downwardly by the reflective material on the underside of the corresponding shelf to capture one or more images of one or more items arranged within the second fixed retail display; and
a second plurality of imagers mounted to one or more shelves of the second fixed retail display having fields-of-view directed across the aisle and toward a shelf of the first fixed retail display to be reflected downwardly by the reflective material on the underside of the corresponding shelf to capture one or more images of one or more items arranged within the second fixed retail display.

18. The inventory management system of claim 17, wherein the first plurality of imagers are integrated with electronic displays disposed on a front face of the one or more shelves of the first fixed retail display, and wherein the second plurality of imagers are integrated with electronic displays disposed on a front face of the one or more shelves of the second fixed retail display.

19. The inventory management system of claim 17, wherein the first plurality of imagers are distributed along a front face of the one or more shelves of the first fixed retail display and interspersed between shelf product labels and/or price tags for the items thereon, and wherein the second plurality of imagers are integrated with electronic displays disposed on the one or more shelves of the second fixed retail display and interspersed between shelf product labels and/or price tags for the items thereon.

20. The inventory management system of claim 17, further comprising a power source disposed at an end of the aisle, wherein wiring of the first plurality of imagers is embedded within the one or more shelves of the first fixed retail display and runs down the one or more shelves to the power source.

* * * * *